United States Patent [19]

Heimke et al.

[11] 3,919,723

[45] Nov. 18, 1975

[54] BONE SHAFT OR BONE JOINT PROSTHESIS AND PROCESS

[75] Inventors: Günther Heimke, Mannheim; Hans Walter Hennicke, Clausthal-Zellerfeld; Ernst Gugel, Rodental-Oeslau, all of Germany

[73] Assignee: Friedrichsfeld GmbH Steinzeug-und Kunstostoffwerke, Mannheim, Germany

[22] Filed: May 20, 1974

[21] Appl. No.: 471,480

[52] U.S. Cl. .................. 3/1.9; 3/1.91; 128/92 C; 106/39.5; 106/40 R
[51] Int. Cl.$^2$ ............................. A61F 1/24
[58] Field of Search .................. 3/1, 1.9–1.913; 128/92 C, 92 CA, 92 R, 92 G; 32/10 A; 106/35, 39.5, 40 R

[56] References Cited
UNITED STATES PATENTS
3,787,900   1/1974   McGee ........................................ 3/1

OTHER PUBLICATIONS
"An Evaluation of Inert & Resorbable Ceramics for Future Clinical Orthopedic Applications" by R. L. Hentrich, *Journal of Biomedical Materials Research*, Vol, 5, No. 1, Jan. 1971, pp. 25–51, 128–92C.
"Glass Ceramic Bone Implant" by T. K. Greenlee, *Journal of Biomedical Materials Research*, Vol. 6, No. 3, May 1972, pp. 235–244, 128–92C.

*Primary Examiner*—Ronald L. Frinks

[57] ABSTRACT

A bone shaft or bone joint prosthesis made of a compacted $Al_2O_3$ ceramic, cement-free implant. At least one substance capable of releasing bone-growth stimulating ionic material (i.e., lithium ions, boron ions, carbon ions, fluorine ions, sodium ions, magnesium ions, silicon ions, phosphorus ions, potassium ions, calcium ions or mixtures thereof) is incorporated at and near at least a portion of the surface of said $Al_2O_3$ implant. The incorporated substance stimulates and controls the attachment of bone tissue to the portions of the surface of implant at the surface locations where the substance is incorporated. The substances can be powdered apatite or apatite-like crystals, such as calcium-aluminum phosphate. A process of preparing the prosthesis which involves placing the substance on at least a portion of the surface of the implant, melting the substance, the substance moving into the affected surface regions of the implant, and cooling the substance to a solid state. Also, a process wherein the implant is inserted into or in contact with a bone or bones; the bone attaching to portions of the surface of the implant which contain the substance — the substance stimulating and controlling the bone attachment.

10 Claims, No Drawings

BONE SHAFT OR BONE JOINT PROSTHESIS AND PROCESS

This invention relates to prostheses made of compacted $Al_2O_3$ ceramic, which can be used for bridging of the missing parts of the shaft of a bone or for the replacement of joints. The invention relates especially to the parts of such prostheses which are intended for anchoring of the prostheses in the adjoining bone space. For this purpose it provides for "doping" the surface of the prosthesis with a substance capable of releasing certain ions; after incorporation (i.e., insertion into place) in the prosthesis, the ions are slowly delivered (or migrate) to the surface to the surrounding bone tissue, and there stimulate and control the new formation of bones and the growing of the newly formed bone onto the surface of the prosthesis (so as to form an attachment therebetween).

Bone shaft and joint prostheses made of compacted $Al_2O_3$ ceramic make possible a cement-free implantation, since it has been discovered that bone tissue can grow on to the surfaces of compacted $Al_2O_3$ ceramic under certain circumstances in such a way, that a firm mechanical connection develops. According to our present knowledge, one will achieve a better mechanical strength, the less the pertinent border surface is moved. For the development of this mechanically strong connection, time period of 1–5 months have been found in animal experiments.

In extensive investigations concerning the reactions of tissue on border surfaces of glass ceramics, it was found that the tissue reactions near the surface can be influenced by ions which diffuse (or migrate) out of the surface. Thus, the kinetics of growing of the tissue onto the surface can be influenced (a) in its temporal course, (b) in the density of the newly formed bone tissue, (c) in the type of the forming border layer, and (d) in the strength of the newly developing connection between bone tissue and implant, by the type of ions which diffuse out of the surface of the implant and through the quantity thereof.

It has furthermore been known that the growing of tissue onto surfaces of compacted $Al_2O_3$ ceramic can be strengthened and accelerated by the fact that, during implantation, small apatite or apatite-like crystals, in powder form, are deposited in the vicinity of these surfaces. Such small apatite crystals may consist of calcium-aluminum phosphate. As far as is known up to now, such small crystals are broken down by the body and resorbed as a result of which, ions, which are needed and useful for the building up of new bone tissue, are released in the vicinity of the border surface. In any case, the corresponding experiments have shown that after deposit of such small crystals near the implantation surface, a mechanically strong connection between the implant and the surrounding bone tissue are more quickly formed.

The use of glass ceramic as a material for prostheses as a replacement for the bone shaft and joint is however, limited to cases where the mechanical load of the prostheses is slight, since the bending strength of glass ceramic is not very high. For the glass ceramic compositions coming into question as a material for implantation, the bending strength lies below 10,000 Newton/$cm^2$. This strength is not sufficient for prostheses of the human bones under heavy loads. Glass ceramics, therefore, were provided for the use on joints under heavy strain as layers applied to metal parts, which serve for the anchoring of the prosthesis. This however, calls for ceramic-metal compound constructions for such prostheses with all the difficulties, inherent in such compound constructions under heavy mechanical loads.

The insertion of growth-stimulating apatites (in powder form) near and at the surfaces of the prosthesis (consisting of compacted $Al_2O_3$ ceramic) is difficult to do in the practice of surgical techniques. It is thus eliminated in actual clinical use.

The bone shaft and joint prostheses according to the invention consist of compacted $Al_2O_3$ ceramic and are intended exclusively for cement-free implantation. Compacted $Al_2O_3$ ceramic has a high bending strength of more than 20,000 Newton/$cm^2$, excellent antifriction properties and high wear resistance for those parts of joint prostheses loaded in friction. Beyond that, it offers even in the pure state, the possibility of forming mechanically solid connections with the bone tissue. In order, however, to keep the time shorter, which is necessary for the formation of this mechanically strong and load bearing connection, ions are inserted, prior to implantation according to this invention, into the surfaces of the parts of the prosthesis which serves for the anchoring of the prosthesis in the adjacent bone space. These ions improve, stimulate and accelerate the formation of a mechanically strong connection of the bone tissue with the implant.

The substances capable of releasing the desired (or certain) ions can be any biologically compatible substance, provided the resultant cations and anions are also biologically compatible, and the substances possess the other required properties. Such substances, for example, can be oxides, phosphates, carbonates, borates, etc. The substance can contain the desired ions in cationic and/or anionic form. An example of this is calcium borate, where the cation is ionic calcium and the anion contains boron. Also, the desired substance fluorine, will be in anionic form — but generally the desired ion will be a simple cationic metal.

The ions of the following elements come into question for this stimulation of growth and have been tested for this characteristic in the various glass ceramic compounds as well as in case of the insertion into $Al_2O_3$ ceramic surfaces, namely; lithium, boron, carbon, fluorine, sodium, magnesium, silicon, phosphorus, potassium and/or calcium. The presence of boron, silicon, phosphorus, potassium and calcium ions in the surface of $Al_2O_3$ ceramic prostheses is particularly favorable.

The substances capable of releasing the deisred ions should only be placed (inserted) on or in the surface regions of the implant where bone growth and/or attachment was desired. The reason for this being that if bone growth, in the case of a joint, was uncontrolled, movement of the joint might be seriously impeded once bone growth was finished by the presence of bone tissue in regions which hinder normal joint movement.

This invention cannot involve merely coating the implant with the desired elements. First, this will not provide the desired elements in ionic form, particularly at the necessary point in time. Gaseous elements, such as fluorine could not even be coated. Several of the desired elements are not biologically compatible in elemental form; sodium would cause the violent destruction of any bone or other body tissue it came in contact with (watery body fluids being present).

The insertion of such ions into the pertinent surfaces of the parts of the implant can be accomplished in accordance with known methods. Thus, for example, the surfaces of the implant into which the ions are to be inserted, can be embedded with or centered with the material capable of releasing the desired ions (e.g., oxides, carbonates or salts, or the pertinent mixtures) and can then be heated to such temperatures at which the pertinent ions move (diffuse) into the surface of the implant. By selection of the temperature for this treatment and the duration for which this temperature treatment is maintained, the quantity of the diffused-in material capable of releasing the desired ions can be varied within relatively wide limits and can be adapted to the conditions which are most favorable for the stimulation of the growth of the tissue. By treatment with acids prior to the just mentioned heat treatment, the rediffusing-in of the ions during this treatment can still be improved.

When the heating method of incorporation is used, the substances capable of releasing the desired ions are melted to form a liquid (actually it may be a slurry as some of the substances may not melt at the heating temperature — this shows why the substances should be in the form of very small particles). A temperature level should not normally be used which decomposes one of the particles, except maybe to drive off water of hydration. The example uses a temperature of 1300°C., but the temperature to be used depends upon the melting point of the substances used.

The substances capable of releasing the desired ions are incorporated into the surface regions of the implant in those regions where bone tissue growth is desired. The desired ions diffuse out of the implant surface regions once the migrating body fluids come in contact with the substances capable of releasing the desired ions. In this manner, bonegrowth is stimulated by the desired ions which have bone-growth stimulating properties. Certain of the desired ions, such as calcium, also are basic materials used in the new bone (formation) itself. The amount of bone growth can be controlled to a degree by the amount of substance (capable of releasing the desired ions) which is incorporated into the implant. Also, if growth is wanted only at certain areas around the implant, then the substances capable of releasing the desired ions are only incorporated in those regions.

The substance capable of releasing the desired ions advantageously has an $Al_2O_3$-containing material that can supply one of the desired ions and $Al_2O_3$.

After incorporation of the substance capable of releasing the desired ions into the prosthesis, any fragments, or the like, of such substance is best removed from the surface of the prosthesis.

Apparently, the new bone attaches to the prosthesis by growing into the surface irregulartities and minute pores of the prosthesis. The implant is faster and more firmly attached than methods using known implants.

As an example, the shaft of the femur part of a hip joint prosthesis of compacted $Al_2O_3$ ceramic, which is intended for implanation in sheep, was embedded (placed) in a powder which contained the following oxides;

40% beta aluminum oxide ($Na_2O$ . $11 Al_2O_3$)
30% calcium borate (3 $CaO$ . $B_2O_3$)
30% calcium phosphate (4 $CaO$ . $P_2O_5$)

The powder particles adhered to the desired regions of the prosthesis.

The embedded prosthesis was then heated in an electrically heated oven to a temperature of 1300°C. (the powder becoming a liquid or slurry), and was kept at this temperature for 16 hours. After cooling and cleaning it of adhering powder particles (components), the formerly white shaft of the prosthesis had a dark color. This prosthesis was then implanted in a sheep together with the untreated socket of the hip joint prosthesis. A prosthesis of the same aluminum oxide ceramic, which however had not been subjected to the diffusion treatment, was implanted in a sheep of the same age and weight. Both sheep were killed after 2 months, the thighs with the implants were removed and the firmness of the seat of the prosthesis was tested. A force which was greater by 30% was needed for the removal of the prosthesis which contained ions in the surface according to this invention, than for the removal of the reference prosthesis.

The prostheses according to this invention, moreover, have the advantage as compared to glass ceramic prostheses, that after awhile, the diffusion of ions out of the surface of the implant dies away completely, since the total quantity of such ions in the surface is limited, whereas ions keep diffusing out of glass ceramic surfaces, since they can be resupplied from the inside of the implant. After the firm anchoring of the implant in the bone has taken place, it is advantageous if the diffusion of the foreign ions ceases since maintenance of the bone by means of blood vessels is more favorable for maintaining stable conditions.

The prosthesis of this invention does not require the use of a cement for attachment.

What is claimed is:

1. The bone shaft or bone joint prosthesis which comprises a compacted $Al_2O_3$ ceramic, cement-free unitary implant and at least one substance capable of releasing bone-growth stimulating ionic material selected from the group consisting of lithium ions, boron ions, carbon ions, fluorine ions, sodium ions, magnesium ions, silicon ions, phosphorus ions, potassium ions, calcium ions and mixtures thereof, incorporated only at and near at least a portion of the surface of said $Al_2O_3$ implant, said substance stimulating and controlling the attachment of bone tissue to the portions of the surface of said implant wherein said substance is incorporated.

2. The prosthesis as described in claim 1 which consists of said compacted $Al_2O_3$ ceramic, cement-free implant and said substance capable of releasing bone-growth stimulating ionic material.

3. The prosthesis as described in claim 2 wherein said substance capable of releasing certain growth stimulating ions is an oxide, a phosphate, a carbonate, a borate, or a mixture thereof.

4. The prosthesis as described in claim 2 wherein said substance capable of releasing certain growth stimulating ions are apatite or apatite-like crystals, in powdered form, deposited on or located near the surface of said compacted $Al_2O_3$ ceramic implant.

5. The prosthesis as described in claim 4, wherein said apatite crystals consist of calcium-aluminum phosphate.

6. The prosthesis as described in claim 2 wherein said substance capable of releasing certain growth stimulating ions contains boron, silicon, phosphorus, potassium and calcium.

7. The prosthesis as described in claim 1 wherein said substance capable of releasing certain growth stimulating ions is an oxide, a phosphate, a carbonate, a borate or a mixture thereof.

8. The prosthesis as described in claim 2 wherein said substance capable of releasing certain growth stimulating ions consists of $Na_2O.11Al_2O_3$, $3CaO.B_2O_3$ and $4Ca.P_2O_5$.

9. The process wherein the implant of claim 1 is inserted into or in contact with a bone or bones, bone attaching to portions of the surface of said implant which contain said substance, said substance stimulating and controlling said bone attachment.

10. The process of claim 9 wherein said implant is treated with acid before said implant is inserted into or in contact with a bone or bones.

* * * * *